3,049,533
OIL SOLUBLE ORANGE AND YELLOW DYES
Penn F. Spitzer, Jr., Bound Brook, and Fridtjof Aagaard, Rahway, N.J., assignors to American Cyanamid Company, New York, N.Y., a corporation of Maine
No Drawing. Filed Mar. 18, 1960, Ser. No. 15,795
2 Claims. (Cl. 260—197)

This invention relates to improved oil soluble azo dyes, one a yellow dye (Old Color Index No. 19 or New Color Index No. 11020) having the formula

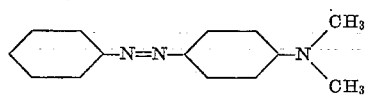

and the other an orange dye (Old Color Index No. 24 or New Color Index No. 12055) having the formula:

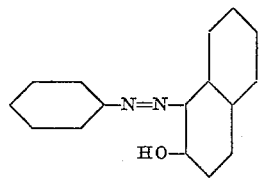

The principal use for these dyes is to color hydrocarbon fuels, such as gasoline stock and fuel oil, either for identification as to grade or origin or in some cases for sales appeal. Thus, for example, some gasolines having desirable anti-knock characteristics are not clear and colorless, and the coloring of such fuels a uniform yellow or orange produces an article which is more attractive to the consumer.

The method of introducing the small amount of the particular coloring matter used in gasolines or other fuels must be relatively simple and inexpensive for the fuel itself is relatively low in price and ordinarily the margin of profit will not stand extensive labor costs.

One of the least expensive and most satisfactory methods is by the so-called dry dye eduction method in which a small amount of finely divided dye is drawn into an eductor probe by vacuum where it is co-mixed with a stream of gasoline or fuel oil and carried to a storage tank. The dry dye eduction method, however, imposes some drastic limitations on the physical characteristics of the color entirely apart from its solubility in hydrocarbons. Thus, the colors must be free-flowing and non-dusting, and particularly they must not cake on storage even under fairly high temperatures such as about 60° C. (140° F.) or higher. If the colors cake in the drums or other containers in which they are shipped and stored, they will clog the eductor tube and render it inoperative.

Unfortunately, the otherwise desirable compounds used in this invention could not be used in this way. The commercially available powders are badly dusting, which not only contaminates other colors in the area but is a serious health hazard because, if inhaled, they can cause serious illness. The dusting problem alone can be solved by using various known dedusting agents, such as light mineral oils. Unfortunately, both colors used in the present invention, as previously available in finely divided powder form, cake seriously alone and even worse when treated with a dedusting agent. Thus, when heated to 65° C. for as little as two hours, a solid cake results, which is completely unusable in a dry dye eductor. Long storage at room temperature produces the same result.

According to the present invention, it is found that both the yellow dye and the orange dye of this invention can be converted to free-flowing, non-dusting platelets of suitable characteristics for use in a dry dye eductor. Moreover, these products are, for all practical purposes, non-caking. Thus, even when heated at 98° C. for three months, they still remain free-flowing and, of course, remain non-caking indefinitely at normal storage temperatures.

There is a definite limit on the dimensions of the platelets of the present invention. One dimension, which will be referred to as thickness, must be considerably smaller than their other dimensions. In order to dissolve at a sufficiently rapid rate to be practically useful, the platelets must not exceed about 1 mm. in thickness. Platelets with a thickness of 0.3 mm. or less are preferred.

The other dimensions are not as critical. In general, both length and breadth should be greater than 0.25 mm. so that the platelets are retained on a No. 60 sieve (U.S. Standard). The upper limit, should be sufficiently small that the platelets will pass through a No. 10 sieve (U.S. Standard). If the platelets are long but narrow and thin, the length may exceed slightly the opening of the No. 10 sieve. These dimensions are preferred for optimum solubility. Larger platelets can be used since the physical limit is placed by the smallest dimension in the eductor itself, which is commonly of the order of magnitude of one inch or somewhat less.

The behavior of the materials of this invention is surprising and an anomalous one. Closely related azo dyes in this form and size range cake badly. One such, e.g., the red dye obtained by diazotizing methyl substituted aminoazobenzenes and coupling to beta naphthol, is known as "Oil Red N–1700." For brevity, this designation will be used in the following examples. It is not known why the yellow and orange dyes of the present invention exhibit such extraordinary resistance to caking in this form when their analogs do not.

The new form of these dyes which form our invention is prepared by a process which has critical limitations. The finely ground powder or dried unground press cake, in which forms the dyes are usually obtained, are melted in any convenient vessel. The oil orange melt is held at temperatures between 130° C. and 175° C. (preferably 160–165° C.) while a drum is rotated in the melt. Similarly the oil yellow melt is held between 112 and 165° C. (preferably 145° C.). The drum surface is held at a temperature of 65° to 80° C. for the yellow and 70° to 90° C. for the orange, ranges that are very critical. The immersion of the drum in the melt must be held to a minimum. It should not be any greater than that which will produce a film of the dye no more than 1 mm. thick. This depth will vary depending on the viscosity of the melt. Scraper knives are positioned to remove the thin film of solidified dye from the drum as flakes.

Since these dyes are to be used in a dry dye eduction process, the rate of solubility in hydrocarbons such as gasoline is all important. This should not be confused with absolute solubility, which is an equilibrium phenomenon. No matter what the form of these dyes, they will eventually all dissolve in the hydrocarbon but the rate at which they do so controls their utility in the dry dye eduction method. It is a general rule that substances dissolve more rapidly the more finely they are divided, i.e., the larger their surface area. It is therefore most unexpected to find that a process which greatly increases the particle size and decreases the surface area does not appreciably reduce the rate of solution.

The temperature of the drum is all important to the rate of solution. If the drum surface is cooler than 70° C. the rate of solubility rapidly falls even though the proper particle size range is obtained. If the surface is hotter than 90° C. the melt does not solidify properly so that the knives can flake the film.

The invention will be described in greater detail in connection with the following specific examples in which the parts are by weight unless otherwise specified. In the examples, for the most part, the procedure has been done on two scales, one a laboratory scale with a small drum and another on a larger drum, which represents more nearly the conditions obtained in commercial plants. As will be seen below, the quality of the products did not vary with the size of the operation.

*Example 1*

The yellow dye (New Color Index No. 11020), the formula of which is in column 1, in the form of a dry press cake, was melted and the melt heated to a temperature of 145° C. The melt was then charged to a tray or pan of the apparatus for forming platelets where it was maintained at about the same temperature. A drum was rotated with its lower portion immersed in the shallow pan containing the molten dye. Scraper knives were positioned to remove the thin film of solidified dye from the drum in the form of platelets. The platelets were then screened to pass No. 10 sieve and retained on No. 40. The details of the operation are as follows:

|  | 1 sq. ft. drum (6 inches diameter) | 19 sq. ft. drum (2 ft. diameter drum by 3 feet long) |
|---|---|---|
| Melt temperature | 145° C | 145° C. |
| Melt tray temperature | 147° C | 147° C. |
| Drum temperature | 70–75° C | 65° C. |
| Drum speed | 22–24 r.p.m | 4½ to 5 r.p.m. |
| Immersion | minimum | minimum. |
| Thickness of platelets | less than 0.3 mm | less than 0.3 mm. |

Two samples of the products were tested with a control, namely, ordinary powdered dye. Comparison for benzene insoluble material, dusting, caking and rate of solution in the standard Stoddard Solvent was made. The results were as follows:

|  | Original Oil Yellow Powder | Oil Yellow 6" Drum | Oil Yellow 24" Drum |
|---|---|---|---|
| Benzene Insolubles, percent | 0.17 | 0.28 | 0.17. |
| Dusting | Dusty | No dust | No dust. |
| ASTM dust test | 0.021 g./75 g | 0.0017 g./75g | 0.0038 g./75 g. |
| Caking Test at: |  |  |  |
| 65° C., 2 hrs | Moderate caking. | Free flowing | Free flowing. |
| 85° C., 2 hrs | Hard caked | do | Do. |
| 98° C., 2 hrs | do | do | Do. |
| 98° C., 3 mos | do | do | Do. |
| Rate of Sol'n in Stoddard Solv.: |  |  |  |
| 15 min | 95% | 97.5% | 99%. |
| 30 min | 97.4% | 98.7% | 100%. |

*Example 2*

The orange dye (New Color Index No. 12055), the formula of which appears in column 1, was prepared in the form of platelets by following the procedure of Example 1 and tested against the ordinary dye powder. Slightly higher temperatures were used because of the higher melting point of the material. The operation and tests are summarized as follows:

|  | 1 sq. ft. drum (6 inches diameter) | 19 sq. ft. drum (2 ft. diameter by 3 ft.) |
|---|---|---|
| Melt temperature | 160–165° C | 165° C. |
| Melt tray temperature | 150° C | 165° C. |
| Drum temperature | 70–75° C | 90° C. |
| Drum speed | 30–35 r.p.m | 1½ to 9 r.p.m. |
| Immersion | minimum | minimum. |
| Thickness of chips | less than 0.3 mm | less than 0.3 mm. |

|  | Original Oil Orange | Oil Orange 6" Drum | Oil Orange 24" Drum |
|---|---|---|---|
| Benzene Insolubles, percent | 0.19 | 0.73 | 0.24. |
| Dusting | Slight Dust | None | None. |
| ASTM Dust Test | 0.0082 g./75 g | 0.001 g./75 g | 0.0031 g./75 g. |
| Caking Test at: |  |  |  |
| 65° C. 2 hrs | Moderate caking. | Free-flowing | Free-flowing. |
| 85° C. 2 hrs | Hard caking | do | Do. |
| 98° C. 2 hrs | do | do | Do. |
| 98° C. 3 mos | do | do | Do. |
| Rate of sol'n in Stoddard Solv.: |  |  |  |
| 15 min | 97.3% | 100% | 96.0%. |
| 30 min |  |  | 100%. |

*Example 3*

An attempt to prepare platelets of Oil Red N–1700 using the procedure described in Example 1 did not give a satisfactory product, when melt temperatures of 145° C. to 155° C., drum temperatures from 34° C. to 110° C. and drum speeds 1 to 1½ r.p.m. were used. The resulting material was glassy and friable.

The properties of Oil Red N–1700 obtained in this example are shown as follows.

Benzene insolubles, percent_____ 0.57.
Caking test at—
    65° C. 2 hrs_____ Hard caking.
    85° C. 2 hrs_____ Do.
    98° C. 2 hrs_____ Cake solid.

*Example 4*

Samples of Oil Orange prepared by the method of Example 2, using different drum temperatures are tested by measuring how fast 0.1 g. dissolves in 100 cc. of a mixed hydrocarbon solvent. The results are as follows:

| Sample | Micromilled Powder | Flake Samples ||||| 
|---|---|---|---|---|---|---|
|  |  | 1 | 2 | 3 | 4 | 5 |
| Drum Temperature (° C.) |  | 90 | 70 | 90 | 90 | 40 |
| Particle Size (Thickness), mm. < | 2½% held on 40 mesh. | 0.22 | 0.21 | 0.29 | 0.71 | 0.459 |
| Rate of Solution: |  |  |  |  |  |  |
| Percent dissolved after— |  |  |  |  |  |  |
| 15 min | 97.3 | 100 | 100 | 100 | 73.0 | 58.4 |
| 30 min |  |  |  |  | 99.3 | 81.0 |
| 45 min |  |  |  |  |  | 97.4 |
| 60 min |  |  |  |  |  |  |
| 90 min |  |  |  |  |  | 100 |

Similarly, the Oil Yellow of Example 1 is tested with the following results:

| Sample | Micromilled Powder | Flake Samples ||
|---|---|---|---|
|  |  | 1 | 2 |
| Drum Temp., ° C |  | 76 | 65 |
| Thickness, mm | 2½% held on 40 mesh. | 0.287 | 0.314 |
| Rate of Solution: |  |  |  |
| Percent dissolved after— |  |  |  |
| 15 min | 95.0 | 100 | 90 |
| 30 min | 97.4 |  | 100 |

We claim:
1. In the process of preparing an oil soluble, dustless, non-caking form of the dye of the formula

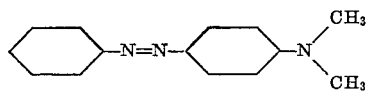

which comprises rotating a drum immersed in a melt of said dye and fracturing into flakes the thin film of solid dye so formed, the improvement of keeping the said melt at a temperature of 112–165° C., keeping the drum surface at a temperature of 65–80° C. and having the said drum in contact with said melt to such a depth that the film picked up is no more than 1 mm. in thickness.

2. In the process of preparing an oil soluble, dustless, non-caking form of the dye of the formula

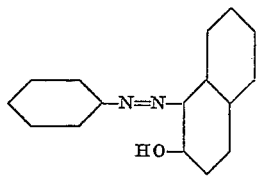

which comprises rotating a drum immersed in a melt of said dye and fracturing into flakes the thin film of solid dye so formed, the improvement of keeping the said melt at a temperature of 130–175° C., keeping the drum surface at a temperature of 70–90° C. and having the said drum in contact with said melt to such a depth that the film of melt picked up is no more than 1 mm. in thickness.

References Cited in the file of this patent

UNITED STATES PATENTS

| | | |
|---|---|---|
| 2,007,386 | Stanley et al. | July 9, 1935 |
| 2,263,616 | Dahlen et al. | Nov. 25, 1941 |
| 2,492,163 | Locke | Dec. 27, 1949 |
| 2,773,056 | Helfaer | Dec. 4, 1956 |

OTHER REFERENCES

Weissberger: "Technique of Organic Chemistry," vol. III, 1950, pages 375, 392, 393, 438. (Copy in Lib.)